3,584,063
1,6,7,7 - TETRAHALOBICYCLO[4,1,0]HEPT-3-ENES AND 1,6,7,7-TETRAHALO - 3,4-DIHALOBICYCLO-[4,1,0]HEPTANES AND METHOD OF PRODUCTION
Stephen W. Tobey, Sudbury, Mass., and David C. F. Law, Midland, Mich., assignors to The Dow Chemical Company, Midland, Mich.
No Drawing. Filed Mar. 7, 1968, Ser. No. 711,190
Int. Cl. C07c 23/28, 23/30
U.S. Cl. 260—648
6 Claims

ABSTRACT OF THE DISCLOSURE

New 1,6,7,7 - tetrahalobicyclo[4,1,0]hept - 3 - enes and 1,3,4,6,7,7 - hexahalobicyclo[4,1,0]heptanes useful as bactericides and fungicides, and a new method for producing them which comprises reacting a tetrahalocyclopropane with 1,3-butadiene at a temperature of from 50° to 120° C.

SUMMARY OF THE INVENTION

The present invention is directed to new 1,6,7,7 - tetrahalobicyclo[4,1,0]hept - 3 - enes and 1,3,4,6,7,7 - hexahalobicyclo[4,1,0]heptane corresponding to the formulas

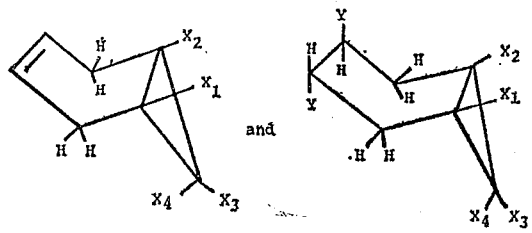

In the present specification and claims, $X_1$ represents a halogen selected from the group consisting of bromine or chlorine, $X_2$ represents the same halogen as $X_1$ or fluorine, $X_3$ represents the same halogen as $X_1$ or fluorine and $X_3$ must represent fluorine when $X_2$ represents fluorine, $X_4$ represents the same halogen as $X_1$ or fluorine and $X_4$ must represent fluorine when $X_3$ represents fluorine; and Y represents chlorine or bromine.

The new compounds of the present invention are crystalline solids and liquids which are of low solubility in water and generally soluble in many common organic solvents. The new 1,6,7,7-tetrahalobicyclo[4,1,0]hept-3-enes and 1,3,4,6,7,7 - hexahalobicyclo[4,1,0]heptanes of the present invention are useful as herbicides, bactericides and fungicides for the kill and control of various plants and bacterial and fungal organisms such as *Staphylococcus aureus*, *Salmonella typhosa*, *Aspergillus terreus*, *Trichophyton mentagrophytes* (the causative organism of athlete's foot), *Mycobacterium phlei*, pig weed, barnyard grass and rice.

In accordance with the new process of the present invention, the new 1,6,7,7 - tetrahalobicyclo[4,1,0]hept - 3 - enes corresponding to the formula

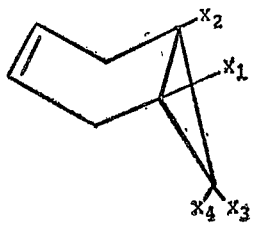

are produced by reacting a 1,3-butadiene with a tetrahalocyclopropene corresponding to the formula

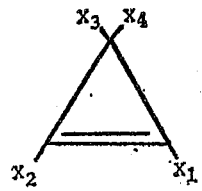

The process of the present invention proceeds readily when the reactants are reacted together in an excess of one of the reactants as reaction medium. However, in a convenient procedure, the tetrahalocyclopropene and 1,3-butadiene are contacted together in an inert organic solvent as reaction medium. Representative inert organic solvents include various aliphatic and aromatic hydrocarbons and ether solvents such as carbon tetrachloride, chloroform, hexane, benzene, toluene, diethyl ether, petroleum ether, tetrahydrofuran and the like. In order to obtain optimum yields of the desired product, it is essential that the reaction mixture be substantially free from water. The presence of water in the reaction mixture in an amount greater than one mole percent causes acid induced polymerization of the butadiene with attendant reduction in the yield of desired product.

The reaction takes place smoothly at temperatures of from about 50° to about 120° C. with the production of high yields of the 1,6,7,7-tetrahalobicyclo[4,1,0]hept-3-ene products. A preferred temperature range for carrying out the process of the present invention is from about 70° to about 100° C. The temperature of the reaction mixture is maintained within the reaction temperature range for a period of from several hours to several days; with the longer reaction times being employed at the lower temperatures. The reaction can be carried out under atmospheric pressures when the reaction temperature is below the boiling temperature of the reaction mixture or under superatmospheric pressures when the reaction is carried out at a temperature above the boiling temperature of the reaction mixture or the reactants, or when an increased reaction rate is desired. Furthermore, the reaction can be carried out under an inert gas such as nitrogen or under an atmosphere of vapors from the reaction mixture.

Good yields of the desired product are obtained when the reactants are employed in proportions ranging from substantially equimolar proportions to a 5-fold excess of either the tetrahalocyclopropene or the 1,3-butadiene with respect to the other reactant; however, such large excesses are generally considered uneconomical. A trace amount of a free radical inhibitor such as 2,6-di-tert-buyl-p-cresol can be added to the reaction mixture to prevent the formation of polymeric by-products.

In carrying out the process of the present invention, the tetrahalocyclopropene and the 1,3-butadiene are admixed with or without an inert organic solvent as reaction mixture, and the resulting reaction medium is maintained at temperatures within the desired temperature range for the desired period of time. Representative tetrahalocyclopropenes include 1,2-dibromo-3,3-difluorocyclopropene; 1,2-dichloro-3,3-difluorocyclopropene; 1,3,3-trifluoro-2-chlorocyclopropene; 1,2,3-trichloro - 3 - fluorocyclopropene and 1,2,3 - tribromo-3-fluorocyclopropene. When carrying out the process of the present invention, the reaction is carried out under superatmospheric pressure. The amount of pressure required is not critical as long as it is sufficient to keep the butadiene in reactive contact with the tetrahalocyclopropene. The amount of pressure required will depend upon such variables as the reaction temperature and the reaction medium employed. In a convenient procedure, the tetrahalocyclopropene is dissolved in an inert solvent and the resulting solution cooled. To this cooled solution is added the gaseous 1,3-butadiene. Following the addition of the butadiene the reaction vessel is sealed and heated to the desired temperature. Following the reaction period, the desired product is isolated from the reaction mixture by conventional procedures, such as distilling the reaction mixture under reduced pressure to remove the low boiling constituents and obtain the desired product as a residue. The product residue is then employed as herein described or further purified by such conventional procedures as washing, recrystallization or distillation before being so employed.

The new 1,3,4,6,7,7 - hexahalobicyclo[4,1,0]heptane compounds of the present invention corresponding to the formula

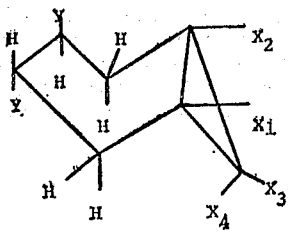

are prepared by halogenating the appropriate 1,6,7,7-tetrahalobicyclo[4,1,0]hept-3-ene at a temperature of from 0° to 60° C.

The 1,6,7,7 - tetrahalobicyclo[4,1,0]hept - 3 - ene to be halogenated is dispersed in an inert chlorinated solvent such as tetrachloroethylene, carbon tetrachloride or chloroform, or carbon disulfide. To the reaction mixture thus formed is added a halogenating agent such as bromine, bromine chloride or gaseous chlorine. The halogenating agent is generally added in an amount in excess of the theoretical amount required to halogenate the 1,6,7,7-tetrahalobicyclo[4,1,0]hept-3-ene. Good yields of the desired product are obtained when the halogenation is carried out at between 0° and 60° C. in a period from about one half hour to two hours. Representative 1,6,7,7-tetrahalobicyclo[4,1,0]hept-3-enes to be halogenated as previously described include 6-chloro-1,7,7-trifluorobicyclo[4,1,0]hept - 3 - ene; 6-bromo-1,7,7-trifluorobicyclo[4,1,0]hept-3-ene; 7 - fluoro - 1,6,7 - trichlorobicyclo[4,1,0]hept-3-ene and 7 - fluoro - 1,6,7 - tribromobicyclo[4,1,0]hept-3-ene.

In carrying out the halogenation process, the 1,6,7,7-tetrahalobicyclo[4,1,0]hept-3-ene is dispersed in the reaction medium and the halogenating agent added thereafter. The bromine is added to the reaction mixture in any convenient fashion. The chlorine is bubbled through the reaction mixture to insure adequate contacting of the reactants. The halogenation reactions are catalyzed by light. In a convenient procedure, when halogenating with bromine or chlorine, the reaction mixture is heated by a sun lamp which provides light as well as heat for the reaction. However, when employing bromine chloride as the halogenating agent, in a preferred procedure, the bromine chloride is added with stirring to a cold, about 0° C., reaction mixture and the reaction thereafter carried out in the cold. Following the halogenation period, the desired product is isolated from the reaction mixture by conventional procedures.

SPECIFIC EMBODIMENTS

The following examples of the present invention are merely illustrative and are not deemed to be limiting.

Example 1

Tetrachlorocyclopropene (1.5 grams, 8.4 mmoles) was dissolved in 2 milliliters of carbon tetrachloride in a reaction tube. The reaction tube and contents were then cooled in Dry Ice and 1,3-butadiene (22 mmoles) distilled into the carbon tetrachloride-tetrachlorocyclopropene solution. The reaction tube was then sealed and the tube and contents heated at a temperature of 80° C. for 18 hours. Following the reaction period, the reaction mixture was distilled at reduced pressure to remove the low boiling constituents and provide an oily residue which solidified upon standing. The solid residue was recrystallized from petroleum ether to obtain a crystalline solid 1,6,7,7 - tetrachlorobicyclo[4,1,0]hept - 3 - ene product melting at 50–51 °C. The yield of the desired product was 92 percent of theoretical yield based upon tetrachlorocyclopropene.

Example 2

Tetrabromocyclopropene (1.5 grams, 4.2 mmoles), 1,3-butadiene (2 milliliters, 22 mmoles) and 2 milliliters of carbon tetrachloride were charged to a reaction tube as in Example 1. The tube was then sealed and heated on a steam bath for 18 hours. Following the reaction period, the reaction tube was cooled to −10° and the seal broken. The tube and contents were then warmed to room temperature and the residual liquid filtered and distilled at decreased pressure to provide a solid residue. The solid residue was recrystallized from petroleum ether to give the crystalline solid 1,6,7,7-tetrabromobicyclo[4,1,0]hept-3-ene product melting at 81–82° C. The product was obtained in a yield of 87 percent of theoretical based upon tetrabromocyclopropene.

Example 3

Tetrachlorocyclopropene (195 grams, 1.1 mmoles) and 1,3-butadiene (20 milliliters, .22 mole) are dispersed in 100 milliliters of benzene. The reaction thus prepared is maintained at 50° C. for five days. Following the reaction period, the reaction mixture is distilled at reduced pressure to obtain an oily residue. This oily residue is triturated with petroleum ether to initiate the crystallization of the 1,6,7,7-tetrachlorobicyclo[4,1,0]hept-3-ene product. This crystalline product is purified by recrystallization from petroleum ether and analyzed by NMR. The NMR spectrum of this product corresponds to the NMR spectrum of the product from Example 1.

Example 4

Tetrabromocyclopropene (7.5 grams, .021 mole) and 1,3-butadiene (.22 mole) are mixed together and the resulting reaction mixture placed in a reaction tube. The reaction tube is sealed and the tube and contents are heated at a temperature of 110° C. for six hours. Following the reaction period, the tube and contents are frozen in liquid $N_2$ before the tube is opened. The tube is then opened and the contents warmed to room temperature during which time the excess butadiene evaporates leaving a solid residue which is thereafter recrystallized from methanol to obtain the 1,6,7,7-tetrabromobicyclo[4,1,0]hept-3-ene product. The infrared and NMR spectrum of the product correspond to the infrared and NMR spectrum of the product of Example 2.

Example 5

1,6,7,7-tetrachlorobicyclo[4,1,0]hept-3-ene (5 grams, .0126 mole) was dispersed in 25 milliliters of carbon tetrachloride. To this dispersion was added 3.65 grams of bromine. The reaction mixture was then warmed to 40° C. and stirred for 45 minutes. Following the reaction period the reaction mixture was extracted with 25 milliliters of aqueous sodium hydrosulfite to convert the excess bromine to bromide which was then removed with the aqueous extraction layer. The extracted organic product containing layer was then dried over molecular sieves and filtered through a shallow bed of Celite diatomaceous earth. The dried organic layer was then placed in a flask and the carbon tetrachloride stripped under reduced pressure to leave a crystalline solid residue which was recrystallized from isopropanol. The recrystallized 1,6,7,7-tetrachloro-3,4-dibromobicyclo[4,1,0]heptane was found to melt at 95–96° C. The NMR spectrum of the product in carbon tetrachloride showed 6 nonequivalent protons with 2 in one group and 4 in the other.

In a similar procedure, 1,3,4,6,7,7-hexabromobicyclo[4,1,0]heptane (molecular weight 569.4) is prepared by brominating 1,6,7,7-tetrabromo[4,1,0]hept-3-ene.

Example 6

A reaction tube was charged with 1,2-dichloro-3,3-difluorocyclopropene (1.5 grams, 10.3 mmoles), 1,3-butadiene (2 milliliters, 22 mmoles) and carbon tetrachloride (2 milliliters). The reaction tube was then sealed and the tube and contents heated over the steam bath for 18 hours. Following the heating period, the reaction mixture was distilled under reduced pressure to remove the low boiling constituents and obtain a liquid 1,6-dichloro-7,7-difluorobicyclo[4,1,0]hept-3-ene product. This product in carbon tetrachloride solution showed triplet vinyl proton $H^1$ resonance at 5.59 p.p.m., plus multiplet methylene resonance of twice the integrated area at 2.89 p.p.m. downfield from internal tetramethylsilane standard. The apparent vinylmethylene proton coupling constants was 1.5 Hz. (c.p.s.). The $F^{19}$ NMR spectrum in carbon tetrachloride solution showed a doublet of pentuplets centered at 130.8 p.p.m., plus an equal area doublet at 143.6 p.p.m. upfield from internal fluorotrichloromethane standard. $J_{F-F}$ (the coupling constant between fluorines) was 156 Hz. (c.p.s.), confirming their geminal location, and the coupling constant between the lower field $F^{19}$ and the methylene protons was 4 Hz.

Example 7

Using the same procedure as that set forth in Example 6, 1,2-dibromo-3,3-difluorocyclopropene and 1,3-butadiene were reacted together in carbon tetrachloride to produce a solid 1,6-dibromo-7,7-difluorobicyclo[4,1,0]hept-3-ene product. This product in carbon tetrachloride solution showed triplet vinyl proton $H^1$ resonance at 5.50 p.p.m., plus multiplet methylene resonance of twice the integrated area at 2.99 p.p.m. downfield from internal tetramethylsilane standard. The apparent vinyl-methylene proton coupling constants was 1 Hz. (c.p.s.). The $F^{19}$ NMR spectrum in carbon tetrachloride solution showed a doublet of pentuplets centered at 117.1 p.p.m., plus an equal area doublet at 142.7 p.p.m. upfield from internal fluorotrichloromethane standard. $J_{F-F}$ (the coupling constant between fluorines) was 152 Hz. (c.p.s.), confirming their geminal location, and the coupling constant between the lower field $F^{19}$ and the methylene protons was 3 Hz.

Example 8

In a further operation, using the same procedure as set forth in Example 7, 1-chloro-2,3,3-trifluorocyclopropene and 1,3-butadiene were reacted together in carbon tetrachloride to produce a liquid 1-chloro-6,7,7-trifluorobicyclo[4,1,0]hept-3-ene product. This product in carbon tetrachloride showed multiplet vinyl proton $H^1$ resonance at 5.52 p.p.m. and multiplet methylene resonance of twice the integrated area at 2.87 p.p.m. downfield from internal tetramethylsilane standard. The $F^{19}$ NMR spectrum in carbon tetrachloride solution showed a doublet of multiplets at 142.0 p.p.m., an equal area quartet at 146.8 p.p.m., and an equal area multiplet at 192.6 p.p.m. upfield from internal trichlorofluoromethane standard. The coupling constant between the 142.0 and 146.8 p.p.m. $F^{19}$ resonances was 170 Hz. confirming the geminal disposition of these fluorines. The high upfield shift of the 192.6 p.p.m. resonating $F^{19}$ confirmed its ring-juncture location and the integrity of the three-membered ring. $J_{F-F}$ cis was less than 3 Hz., and $J_{F-F}$ trans was 4 Hz. The methylene proton to 142.0 p.p.m. $F^{19}$ coupling constants were both less than 3 Hz.

Example 9

1,6,7,7-tetrabromobicyclo[4,1,0]hept-3-ene (40 grams, 0.1 mole) is dispersed in chloroform with stirring in a Pyrex reaction vessel. The stirring is continued and gaseous chlorine (2 moles) is added to the reaction mixture through a sintered glass tube over a period of about one hour. During the addition of the chlorine, the reaction mixture is heated to 55° and the reaction catalyzed by the sun lamp placed about 6 inches from the reaction vessel. Following the reaction period, the reaction mixture is washed with water, dried over molecular sieves and distilled under reduced pressure to obtain the 1,6,7,7-tetrabromo-3,4-dichlorobicyclo[4,1,0]heptane product as a crystalline solid. 1,6,7,7-tetrabromo-3,4-dichlorobicyclo[4,1,0]heptane has a molecular weight of 480.5.

In a similar procedure, 1,6,7,7-tetrachlorobicyclo[4,1,0]hept-3-ene is chlorinated to produce 1,3,4,6,7,7-hexchlorobicyclo[4,1,0]heptane (molecular weight 338.1) and 1,6-dibromo-7,7-difluorobicyclo[4,1,0]hept-3-ene is chlorinated to produce 1,6-dibromo-3,4-dichloro-7,7-difluorobicyclo[4,1,0]heptane (molecular weight 358.7).

Example 10

1,6,7,7-tetrabromobicyclo[4,1,0]hept-3-ene (20 grams, 0.05 mole) is dissolved in 50 milliliters of carbon tetrachloride and the reaction mixture thus formed is cooled to 0° C. in an ice bath. Bromine chloride (0.1 mole) is added with stirring to the cooled reaction mixture. Following the addition of the bromine chloride the stirring is continued and the reaction mixture is maintained at 0° C. for one hour. Upon completion of the reaction period the reaction mixture is distilled under reduced pressure to remove the low boiling constituents and obtain the 1,3,6,7,7-pentabromo-4-chlorobicyclo[4,1,0]heptane product as a crystalline solid. The molecular weight of 1,3,6,7,7-pentabromo-4-chlorobicyclo[4,1,0]heptane is 522.3.

In further operations carried out as described in Example 10, 1,3,6,7,7-pentachloro-4-bromobicyclo[4,1,0]heptane (molecular weight 380.6) is prepared by halogenating 1,6,7,7-tetrachlorobicyclo[4,1,0]hept-3-ene with bromine chloride.

Compounds of the present invention are useful for the control and kill of various bacterial and fungal pests and as pre-emergence herbicides. For such use, the unmodified compound can be employed. Alternately, the compound can be dispersed on an inert solid and the resulting product can be employed as a dust. Also, such preparation can be dispersed in water with or without the aid of a wetting agent, and the resulting aqueous dispersions employed as sprays, drenches or washes. In other procedures, the compound can be employed in oil or other solvents or as a constituent solvent-in-water or water-in-solvent emulsions or as aqueous dispersions thereof which can be applied as a spray, drench, or wash. In representative operations, the desired compound was added to a nutrient agar composition. The nutrient composition was then poured into a petri plate and after solidification was surface inoculated with the bacterial or fungal organism to be tested. The inoculated plates were incubated under optimal growth conditions for the organism being tested. As a result of such operations, 1,6,7,7-tetrachlorobicyclo[4,1,0]hept-3-ene, when employed in nutrient agar in an amount sufficient to supply 500 parts per million by weight of the composition and as the sole toxic constituent, gave complete kills of *Salmonella typhosa*, *Mycobaceterium phlei*, and *Trichophyton mentagrophytes*. In addition, in similar operations 1,6,7,7-tetrabromobicyclo[4,1,0]hept-3-ene, when employed as the sole toxic constituent at a rate of 500 parts per million by weight of the total agar composition, gave complete control of the growth of *Staphylococcus aureus*, *Pulluraria pullulans* and *Aspergillus terreus*. In further operations carried out as previously described, 1,3,4,6,7,7-hexabromobicyclo[4,1,0]heptane gave complete control of the growth of *Staphylococcus aureus*, *Mycobacterium phlei*, *Trichophyton mentagrophytes*, *Aspergillus terreus*, and *Rhizopus nigricans* when employed at a concentration of 1000 parts per million as the sole toxic constituent in the growth medium. In further operations, 1,6,7,7-tetrachlorobicyclo[4,1,0]hept-3-ene and 1,6-dibromo-7,7-difluorobicyclo[4,1,0]hept-3-ene each, when employed as the sole toxicant in a soil drench and applied to the soil in an amount sufficient to provide 100 pounds per acre of toxicant compound, give substantially complete kill of the seeds of pig weed, barnyarn grass and rice. In other similar operations, 1,6,7,7-tetrabromobicyclo[4,1,4]hept-3-ene and 3,4-dibromo-1,6,7,7-tetrachlorobicyclo[4,1,0]heptane each give substantially complete kills of the seeds of barnyard grass when employed as the sole active constituent in a soil drench which is applied in an amount sufficient to provide the active constituent at a rate of 100 pounds per acre.

The tetrahalocyclopropene starting materials employed in the present invention are known in the art and are prepared in accordance with known procedures. A representative procedure for preparing the tetrahalocyclopropenes is set forth in U.S. Pat. No. 3,335,194.

What is claimed is:

1. A new compound selected from the group of 1,6,7,7-tetrahalobicyclo[4,1,0]hept-3-enes and 1,3,4,6,7,7-hexahalobicyclo[4,1,0]heptanes corresponding to the formulas

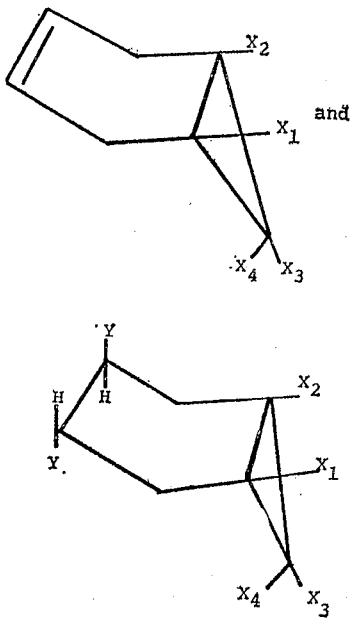

wherein $X_1$ represents a halogen selected from the group consisting of chlorine or bromine; $X_2$ represents a member of the group consisting of the same halogen as represented by $X_1$ or fluorine; $X_3$ represents a member of the group consisting of the same halogen as represented by $X_1$ or fluorine, however, $X_3$ must represent fluorine when $X_2$ represents fluorine; and $X_4$ represents a member of the group consisting of the same halogen as represented by $X_1$ or fluorine, however, $X_4$ must represent fluorine when $X_3$ represents fluorine; and Y represents a member of the group consisting of bromine and chlorine.

2. The process which comprises reacting 1,3-butadiene with a member of the group of tetrahalocyclopropenes corresponding to the formula

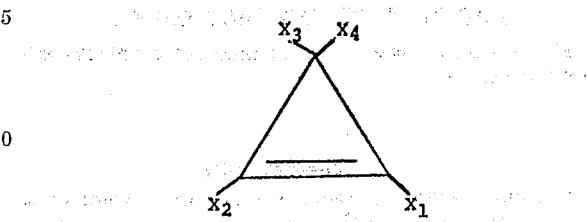

wherein $X_1$ represents a halogen selected from the group consisting of chlorine or bromine; $X_2$ represents a member of the group consisting of the same halogen as represented by $X_1$ or fluorine; $X_3$ represents a member of the group consisting of the same halogen as represented by $X_1$ or fluorine, however, $X_3$ must represent fluorine when $X_2$ represents fluorine; and $X_4$ represents a member of the group consisting of the same halogen as represented by $X_1$ or fluorine, however, $X_4$ must represent fluorine when $X_3$ represents fluorine; said process being carried out in the temperature range of from about 50 to about 120° C.

3. The new compound claimed in claim 1 wherein the 1,6,7,7-tetrahalobicyclo[4,1,0]hept-3-ene is 1,6,7,7-tetrachlorobicyclo[4,1,0]hept-3-ene.

4. The compound claimed in claim 1 wherein the 1,6,7,7-tetrahalobicyclo[4,1,0]hept-3-ene is 1,6,7,7-tetrabromobicyclo[4,1,0]hept-3-ene.

5. The compound claimed in claim 1 wherein the 1,3,4,6,7,7-hexahalobicyclo[4,1,0]heptane is 1,6,7,7-tetrachloro-3,4-dibromobicyclo[4,1,0]heptane.

6. The compound claimed in claim 1 wherein the 1,6,7,7-tetrahalobicyclo[4,1,0]hept-3-ene is 1,6-dibromo-7,7-difluorobicyclo[4,1,0]hept-3-ene.

References Cited

Chem. and Eng. News, p. 45, Oct. 2, 1967.

DANIEL D. HORWITZ, Primary Examiner

U.S. Cl. X.R.

424—352; 71—126